Oct. 2, 1928.　　　　　　　　　　　　　　　　　　　　　1,686,006

C. JABLOW

ELECTROMAGNETIC BRAKE

Filed Nov. 10, 1922

WITNESSES:

INVENTOR
Charles Jablow
BY
ATTORNEY

Patented Oct. 2, 1928.

1,686,006

UNITED STATES PATENT OFFICE.

CHARLES JABLOW, OF EAST PITTSBURGH, PENNSYLVANIA, ASSIGNOR TO WESTINGHOUSE ELECTRIC & MANUFACTURING COMPANY, A CORPORATION OF PENNSYLVANIA.

ELECTROMAGNETIC BRAKE.

Application filed November 10, 1922. Serial No. 599,997.

My invention relates to electromagnetic brakes and it has particular relation to brakes employed in connection with hoists, mill machinery and the like.

The object of my invention is to provide a brake mechanism which is of simple construction, efficient in operation and readily adjustable.

According to my invention, I provide a pair of pivotally mounted brake arms having removable shoes to which are riveted suitable brake linings. Each brake arm is preferably provided with suitable bosses that are adapted to be finished for alinement with the removable shoe. In one embodiment of my invention, the end portions only of the shoes are finished to correspond to the above-mentioned bosses. Each shoe is fastened in position by means of a key, which, when driven into place, wedges the shoe in proper position. The means employed by me for mounting the shoes avoids a considerable amount of machine finishing, since the shoes engage the brake arms at two points only, either of which may be trimmed to ensure the desired alinement of the brake-shoe lining with the brake wheel.

The principal advantage of my means for mounting the shoes is that worn-out shoes are easily replaced with a minimum amount of fitting. For shoes of large size and extremely severe service, a third point of support may be provided, preferably at the center of the shoe, thereby lending additional support at the point where it is most needed.

For convenience, the brake levers and the operating magnet coil are mounted on a single base plate, and the magnet armature is pivotally mounted on one of the brake arms, which carries also a spring and a spring housing for biasing the armature and brake arms against the action of the electromagnet. The armature, at its opposite end, is connected, by means of a rod, to the other brake arm. A stop is provided for limiting the releasing movement of the one brake arm when the operating coil is energized and forms a fulcrum for insuring the release of the other brake arm.

Many brake mechanisms now employ complicated toggle mechanisms or require special means for supporting the operating magnet and movable parts associated therewith. My arrangement of supporting the armature greatly simplifies the brake structure.

Figure 1:
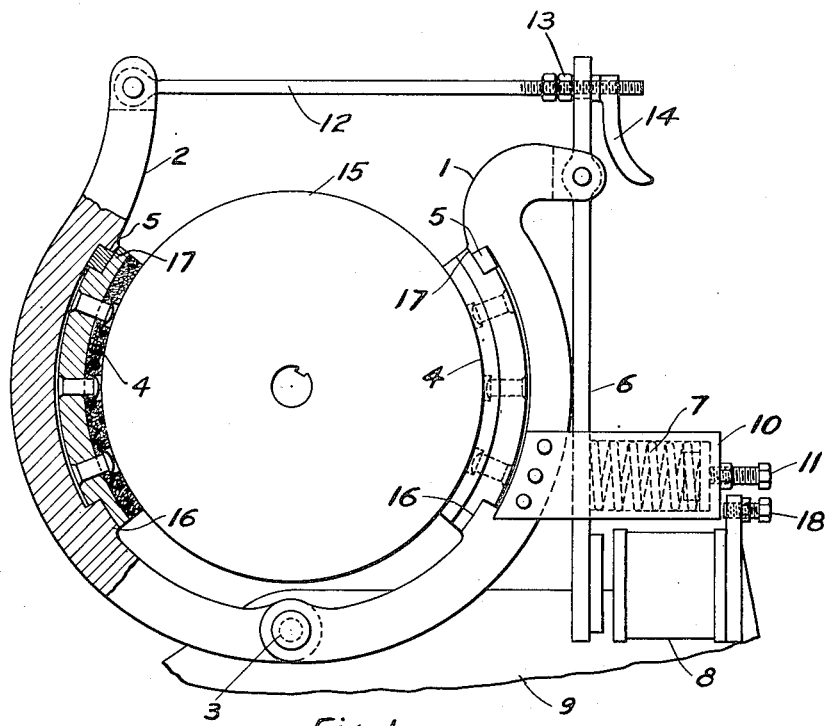
Figure 2:
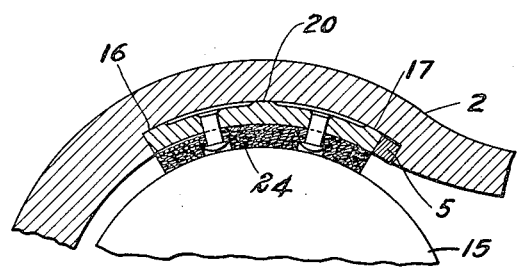

My invention will be described in connection with the accompanying drawing in which, Figure 1 is a view, partly in elevation and partly in section, of apparatus embodying my invention, and Fig. 2 is a sectional view of a modification of a portion of the apparatus illustrated in Fig. 1.

A pair of brake arms 1 and 2 are mounted preferably on a single centrally located bearing 3, and each arm is provided with a removable shoe 4, of any suitable construction, which is held in position by means of a key or wedge 5. An armature member 6 is pivotally mounted on the brake arm 1 and is biased, by means of an adjustable spring 7, to oppose the influence of a stationary magnet 8. The arms 1 and 2 and the magnet 8 are so supported upon a suitable base 9 that the brake mechanism is a self-contained unit. A housing 10, for the spring 7, is also mounted on the arm 1 and means, comprising a bolt 11, serves for adjusting the tension of the spring 7. The end of the armature 6 remote from the magnet 8 adjustably engages a rod or link 12, which is pivotally connected to the other brake arm 2. The effective length of rod 12 is varied by means of suitable adjusting nuts 13 and 14. A brake wheel 15, of familiar design, completes the essential parts of my invention.

Referring particularly to Fig. 1, it should be noted that the shoe 4 is in contact with brake arm 1 or brake arm 2 only near the ends of the shoe, so that these members may be cast independently and finished only over a relatively small area. The bosses 16 and 17 are trimmed to receive the shoe 4, and the final fitting of the shoe to the wheel 15 is accomplished by trimming the ends of the shoe. When a shoe requires replacement, it is necessary only to trim the ends of the new shoe. It is even possible, with this arrangement, to machine both arms and shoes so that there is a perfect interchangeability without the necessity of any fitting when it becomes necessary to replace worn-out shoes.

The proper air gap is established between the armature 6 and the magnet 8 by means of adjusting nuts 13 and 14, as will be readily understood, and the desired pressure between the shoes 4 and the wheel 15 is maintained by means of spring 7 and its adjusting bolt 11.

When the electromagnet 8 is energized, from any suitable source, the armature 6 is attracted and, pulling against the spring 7, draws the arm 1 to the right until the housing 10 engages an adjustable stop 18. Further movement of the armature 6 actuates rod 12 to the left and releases brake arm 2.

I have described the movements of brake arms 1 and 2 independently, but, in actual operation, on account of the relatively short path of travel of the armature 6 and the housing 10, the shoes 4 will be released from the brake wheel 15 simultaneously. The movement of the housing 10 to engage the stop 18 is relatively slight, since only a very small air gap is necessary to release the shoe from the wheel.

In Fig. 2, I have illustrated a modified form of shoe 24 having a three-point support, including a central bearing boss 20, which provides additional rigidity when desirable. Other modifications may readily be made to suit peculiar individual requirements.

Those familiar with the art will appreciate the relatively simple construction embodying my invention, in which the number of moving parts is reduced to a minimum and the employment of a special housing for supporting the brake magnet and brake arms is unnecessary. It is also believed that the considerable difficulty that has been encountered in the prior art has been overcome by my arrangement for mounting the renewable brake shoes.

I have illustrated a preferred form of my invention but modifications may readily be made without departing from the spirit and scope thereof, as set forth in the appended claims.

I claim as my invention:

1. An electromagnetic brake comprising a pair of independently movable brake arms, a stationary magnet-coil, an armature member mounted on one only of the brake arms for actuating said arms and a spring connection between said armature and said one brake arm.

2. An electromagnetic brake comprising a pair of independently movable brake arms, a stationary magnet-coil, an armature member pivotally mounted on one only of the brake arms for actuating said arms and a spring having one end connected to the armature member and its other end connected to said one brake arm.

3. An electromagnetic brake comprising of a pair of independently movable brake arms, a stationary magnet-coil, an armature member pivotally mounted on one of the brake arms for actuating said arms and a spring carried on one of said brake arms for actuating the armature.

4. An electromagnetic brake comprising a pair of independently movable brake arms, a stationary magnet-coil, an armature member pivotally mounted on one of the brake arms for actuating said arms and a spring carried on one of said brake arms for biasing the armature member to oppose the action of said magnet coil.

5. An electromagnetic brake comprising a pair of movable brake arms, a stationary magnet-coil, an armature member mounted on one of the brake arms for actuating said arms, a spring for biasing the armature to a predetermined position, a spring housing carried on said one brake arm, a stop member for limiting the movement of said one brake arm when said armature is operative and a link connected to said armature for actuating the other brake arm.

In testimony whereof, I have hereunto subscribed my name this 4th day of November, 1922.

CHARLES JABLOW.